Nov. 20, 1951 — L. N. ANDERSON — 2,575,326
SYSTEM OF FREIGHT LOADING AND HANDLING
Filed Nov. 19, 1947 — 3 Sheets-Sheet 1

INVENTOR.
Lucian N. Anderson,
BY Victor J. Evans & Co.
ATTORNEYS

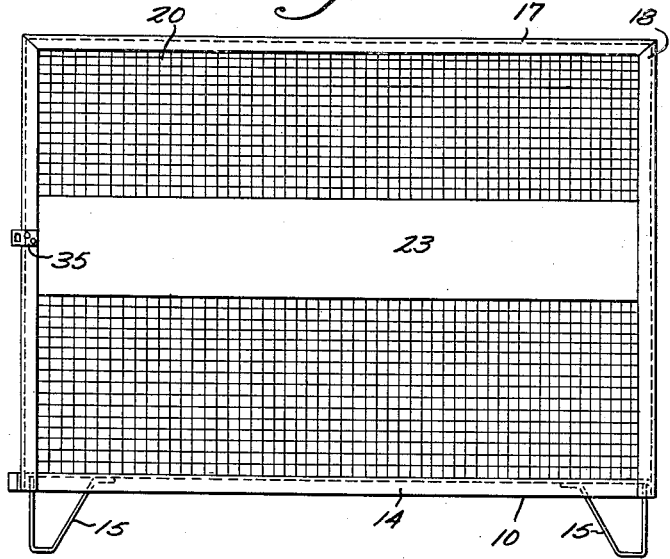
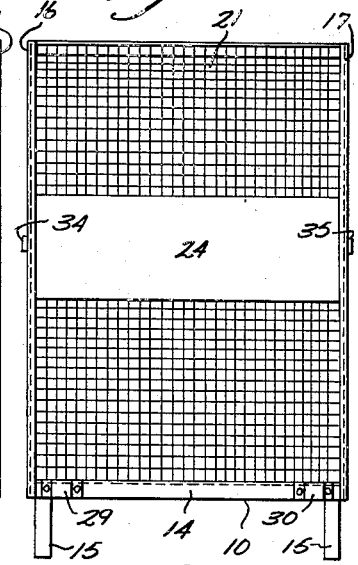
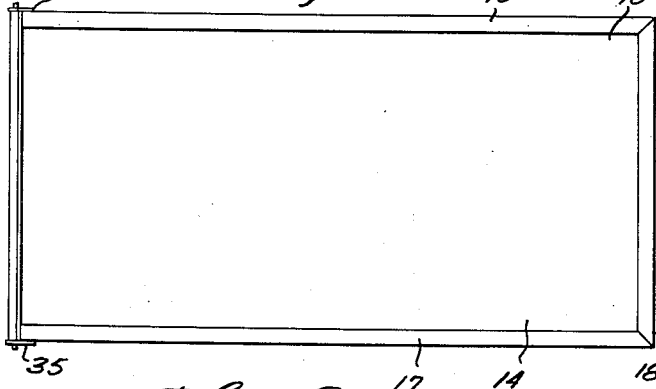
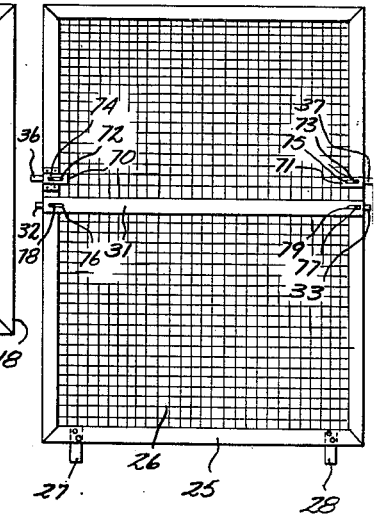
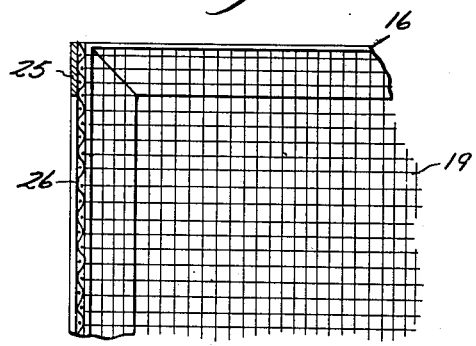

Nov. 20, 1951 L. N. ANDERSON 2,575,326
SYSTEM OF FREIGHT LOADING AND HANDLING
Filed Nov. 19, 1947 3 Sheets-Sheet 3
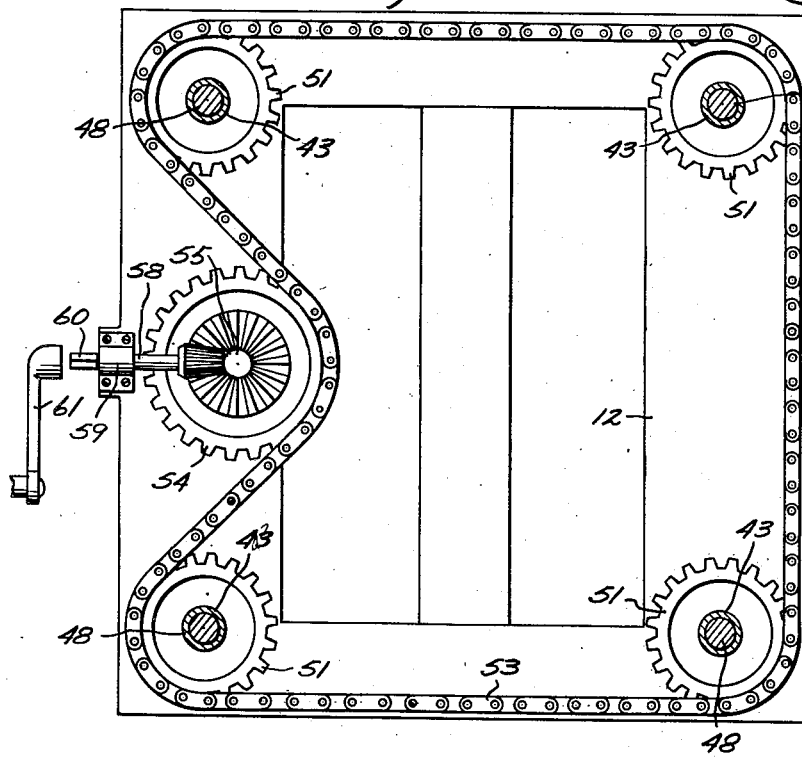
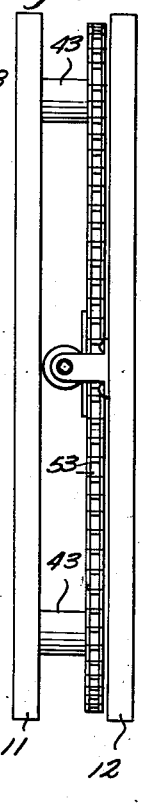
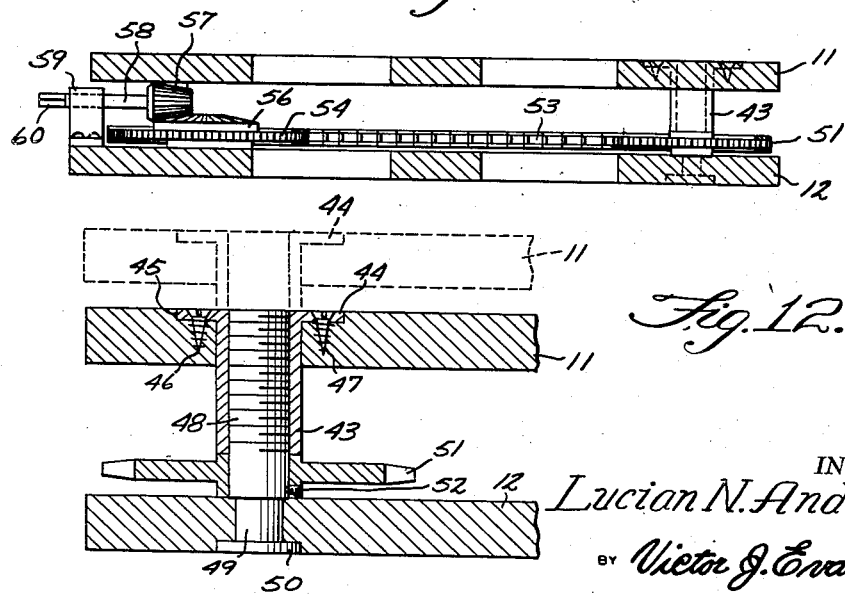
INVENTOR.
Lucian N. Anderson,
BY Victor J. Evans & Co.
ATTORNEYS Patented Nov. 20, 1951

2,575,326

UNITED STATES PATENT OFFICE 2,575,326

SYSTEM OF FREIGHT LOADING AND HANDLING

Lucian N. Anderson, Babbitt, Nev.

Application November 19, 1947, Serial No. 786,948

1 Claim. (Cl. 105—366)

This invention relates to partially enclosed pallets or containers used in shipping cargo and freight wherein merchandise and other products are packed in enclosures and the enclosures, as complete units, are packed in freight cars, trucks, airplanes, and the like, and in particular the invention includes enclosures formed on pallets in combination with clamping means for preventing shifting of the pallets in transit.

The purpose of this invention is to expedite the shipment of cargo and freight and particularly the loading and unloading thereof in carriers.

In a usual freight shipment miscellaneous packages and cartons are checked, from a list, into a truck at the point of origin, and each time the cargo is transferred from one carrier to another or to a warehouse the articles are rechecked, and this transaction is repeated until the cargo arrives at its destination. Furthermore in shipment the cargo often shifts and causes damage. With these thoughts in mind this invention contemplates packing the cargo, as a unit, into an enclosure on a pallet and loading the pallet or a plurality of pallets into a carrier, and then clamping the pallets in position in the carrier.

The object of this invention is, therefore, to provide a pallet with walls into which miscellaneous cargo may be packed, and which may readily be placed in a carrier, and means for clamping or wedging the pallet or a plurality of pallets in position in the carrier.

Another object of the invention is to provide a spreader mechanism adapted to be placed between pallets loaded with cargo by which the pallets may be retained in position in a carrier or the like in transit.

Another object of the invention is to provide a partially enclosed pallet into which cargo may be packed and means for clamping the pallet in an airplane.

A further object of the invention is to provide an improved system for handling and loading freight which involves elements of simple and economical construction.

With these and other objects and advantages in view the invention consists of the new and novel combination, construction, and arrangement of parts as hereinafter more fully described, set forth in the claim appended hereto, and disclosed in the accompanying drawings, forming part hereof, wherein:

Figure 4 is a detail showing a side elevation of a typical pallet.

Figure 5 is a view showing an end elevation of a pallet with the door thereof removed.

Figure 6 is a plan view of the pallet shown in Figure 4.

Figure 7 is a view showing the removable door of the pallet.

Figure 8 is a detail showing a section through an upper corner of the pallet illustrating the door in position thereon with the door in section.

Figure 9 is a longitudinal section through the spreader mechanism and with one side thereof removed.

Figure 10 is a view showing an end elevation of the spreader mechanism looking toward the actuating gear shaft.

Figure 11 is a sectional plan view through the spreader mechanism.

Figure 12 is a section through one of the expanding gears of the spreader mechanism.

Figures 1, 2:
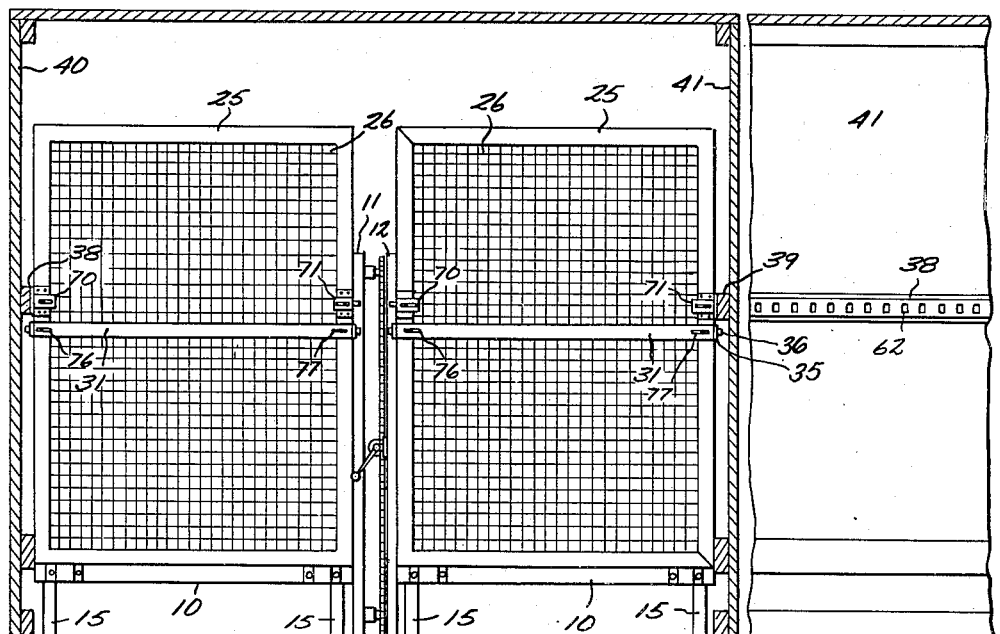
Figure 1 is a longitudinal sectional elevational view through a carrier body illustrating pallets clamped laterally in position therein by a spreader mechanism.
Figure 2 is a longitudinal section through a carrier body showing a pallet holding rack therein with parts broken away.
Figure 3A:
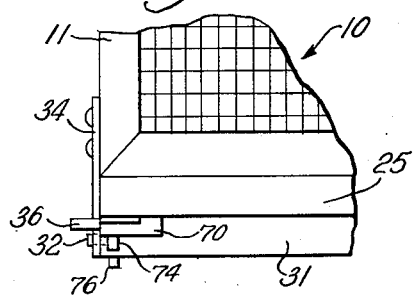
Figures 3 and 3a are views showing certain constructional details of the apparatus.
Figure 3:
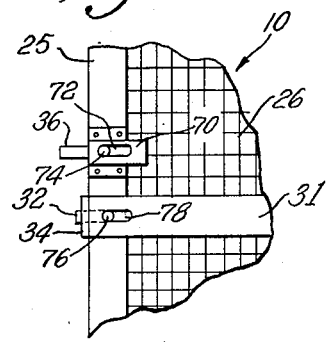

Referring now to the drawings wherein like reference characters indicate corresponding parts the freight loading and handling system of this invention includes a pallet or container 10, as illustrated in Figures 4 to 8 inclusive, a spreader mechanism having sides or panels 11 and 12, as illustrated in Figures 9 to 12, inclusive.

The pallet 10 is formed with a platform 14 having feet 15, and in the design shown, an enclosure is provided on the platform having rectangular-shaped sides formed by frames 16 and 17 connected at one end by a frame 18, and the frames are covered by wire mesh sections 19, 20, and 21. Plates 22 and 23 are provided on the sides and a similar plate 24 is provided at the end. A removable door 25 is provided for the open or outer end, and this is provided with a frame, to which the numeral 25 refers, which is covered by wire mesh 26. Projections 27 and 28 extend from the lower end of the door which extend into sockets 29 and 30 on the end of the platform as shown in Figure 5, and a cross bar 31 with pins 32 and 33 extending from the ends is provided on the face of the door and positioned so that the pins snap into spring latches 34 and 35 on the ends of the sides. The edges of the door are also provided with projections 36 and 37 that are positioned to extend into racks 38 on rails 39 on the inner surfaces of the side walls 40 and 41 of a carrier body 42, as shown in Figure 1.

The sides or panels 11 and 12 of the spreader mechanism are formed as illustrated in Figures 9 to 12, inclusive, and extending between the panels are internally threaded tubular bearings with flanged ends by which they are mounted in the panel 11, and as the four bearings are similar they are indicated by the numeral 43 and the flanges 44 at the ends are secured in recesses 45 in the panel 11 by screws 46 and 47. Stub shafts 48 are threaded in the bearings and the outer ends of the shaft are formed with pins 49 having heads 50, through which they are rotatably mounted in the panel 12, and the shafts are rotated through sprockets 51 which are fixedly mounted thereon by set screws 52, as shown in Figure 12.

A chain 53 is trained over the sprockets 51 and also over a sprocket 54 on a shaft 55 on which is a bevel gear 56 that meshes with a pinion 57 on a shaft 58 which is mounted in a bearing 59 and provided with a squared outer end 60. A crank 61 is provided for turning the shaft 58 and as the shaft is turned the gears actuate the chain which turns the stub shafts 48, and as these shafts turn in one direction the panels 11 and 12 are forced apart so that the pallets can be separated and wedged against the sides of the carrier body. As the pallets are separated the projections 36 and 37 engage notches or openings 62 in the racks, also as shown in Figure 1, wherein the pallets are wedged against the sides of the carrier body by the expanding panel and held longitudinally by the projections 36 and 37 and racks 38.

It will also be understood that although the upper parts of the pallets are illustrated as formed of wire mesh they may be made of any suitable material and the door or parts thereof may also be formed in any manner. It will be noted in Figure 7 that the projections 36 and 37 have associated therewith base plates or casings 70 and 71 which have slots 72 and 73 therein, and pins 74 and 75 slidably project through these slots 72 and 73, the pins 74 and 75 being used to retract or disengage the pins 36 and 37 from the openings or notches 62 in the rails 38 or 39. The pins 32 and 33 in the ends of the crossbar 31 are provided with transverse portions 76 and 77 which are adapted to be extended through slots 78 and 79 that are arranged adjacent the ends of the bar 31 wherein portions 76 and 77 may be manually actuated in order to move the pins 74 and 75 into and out of engagement with the spring latches 34 and 35.

With the parts arranged in this manner miscellaneous cargo or freight of any type may be packed in the pallets shipped from point to point as a unit, and the pallets may be packed in a truck or trailer body as shown in Figure 1 with an expanding spreader mechanism therebetween. The panel may be actuated to wedge the pallets against the sides of the body, and the projections may interengage with the racks on the sides of the body to lock the pallets in place. As the truck or trailer body is filled with pallets the locking means at the sides may be omitted and the pallets secured at the end of the body by the doors or tailgate.

It will be understood that modifications may be made in the design and arrangement of parts without departing from the spirit of the invention.

What is claimed is:

In combination, a carrier body including vertically disposed spaced parallel side walls, and a horizontally disposed bottom wall, a plurality of containers movably supported on said bottom wall, a horizontally disposed rail secured to the inner surface of each of said side walls, there being a plurality of spaced openings arranged in each of said rails, projections arranged on each of said containers and adapted to seat in the openings in said rails for preventing longitudinal shifting of said containers, and a manually operable spreader mechanism interposed between adjacent pairs of said containers, said spreader mechanism including a pair of spaced parallel vertically disposed panels arranged in engagement with the opposed sides of said containers whereby actuation of said spreader mechanism causes simultaneous movement of said containers toward the side walls of said body to thereby cause said projections to seat in said openings.

LUCIAN N. ANDERSON.

REFERENCES CITED

The following references are of record in the file of this patent:

UNITED STATES PATENTS

| Number | Name | Date |
| --- | --- | --- |
| 840,770 | Ives | Jan. 8, 1907 |
| 1,206,648 | Bacon | Nov. 28, 1916 |
| 1,702,169 | Norman | Feb. 12, 1929 |
| 1,819,978 | Shur | Aug. 18, 1931 |
| 1,851,461 | Stebler | Mar. 29, 1932 |
| 2,017,301 | Wynn | Oct. 15, 1935 |
| 2,038,064 | Stetson | Apr. 21, 1936 |
| 2,056,815 | Wynn | Oct. 6, 1936 |
| 2,137,255 | Tuttle | Nov. 22, 1938 |
| 2,169,677 | Burrell | Aug. 15, 1939 |
| 2,172,154 | Perin | Sept. 5, 1939 |
| 2,198,155 | Fahland | Apr. 23, 1940 |
| 2,279,522 | Price | Apr. 14, 1942 |
| 2,354,861 | Hermann | Aug. 1, 1944 |
| 2,424,768 | Nalbandian | July 29, 1947 |